United States Patent [19]

Clusener

[11] 4,304,380
[45] Dec. 8, 1981

[54] INSTRUMENT SUPPORT APPARATUS

[76] Inventor: Gerhard R. Clusener, 6 E. High Rd., Port Washington, N.Y. 11050

[21] Appl. No.: 14,986

[22] Filed: Feb. 26, 1979

[51] Int. Cl.³ .............................................. F16L 3/00
[52] U.S. Cl. .................................................. 248/122
[58] Field of Search ............... 248/105, 106, 121, 122, 248/125, 165, 441 R, 445, 454, 456, 457, 474, 662

[56] References Cited

U.S. PATENT DOCUMENTS

| | | | |
|---|---|---|---|
| 424,262 | 3/1890 | Bogy | 248/456 |
| 743,914 | 11/1903 | McMurran | 248/106 |
| 2,147,347 | 2/1939 | Jury | 248/456 |
| 2,473,047 | 6/1947 | Bershad | 248/165 X |
| 2,681,782 | 6/1954 | Morishita | 248/106 |
| 2,953,338 | 9/1960 | Hodgson | 248/106 |
| 2,973,929 | 3/1961 | Zawadski | 248/514 X |
| 3,185,416 | 5/1965 | Osinski | 248/121 X |
| 3,591,115 | 7/1971 | Hibbard | 248/122 |

Primary Examiner—William H. Schultz
Attorney, Agent, or Firm—Burton E. Levin

[57] ABSTRACT

An improved stand is described for supporting the scientific instrument and accessories, such as a dilatometer and electric furnace, comprising a box base and an upright inverted U or box frame. Means also are described for varying the point of attachment and angle of the upright frame to the base. The upright frame may be equipped with the variety of instruments support brackets, including telescoping slides, which are extendable beyond the frame and which permit the frame to be used alone in a horizontal position or attached to the base in an upright position.

9 Claims, 13 Drawing Figures

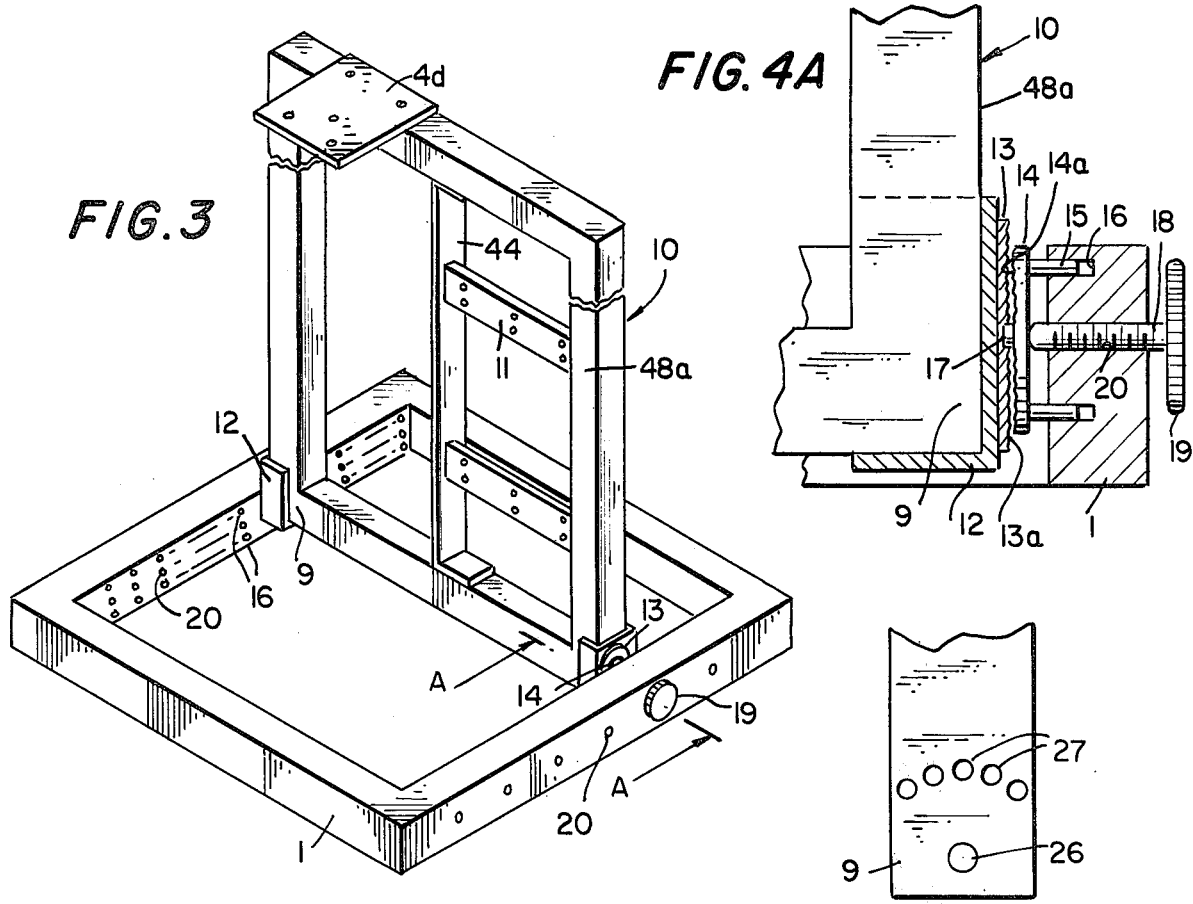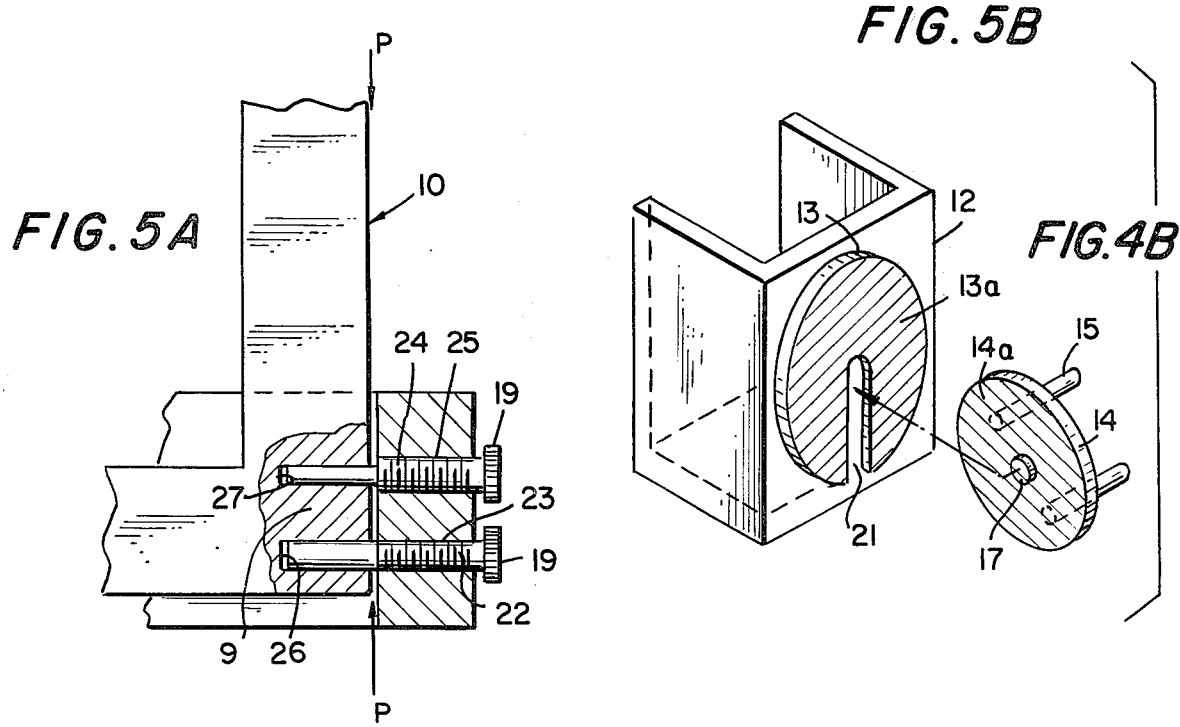

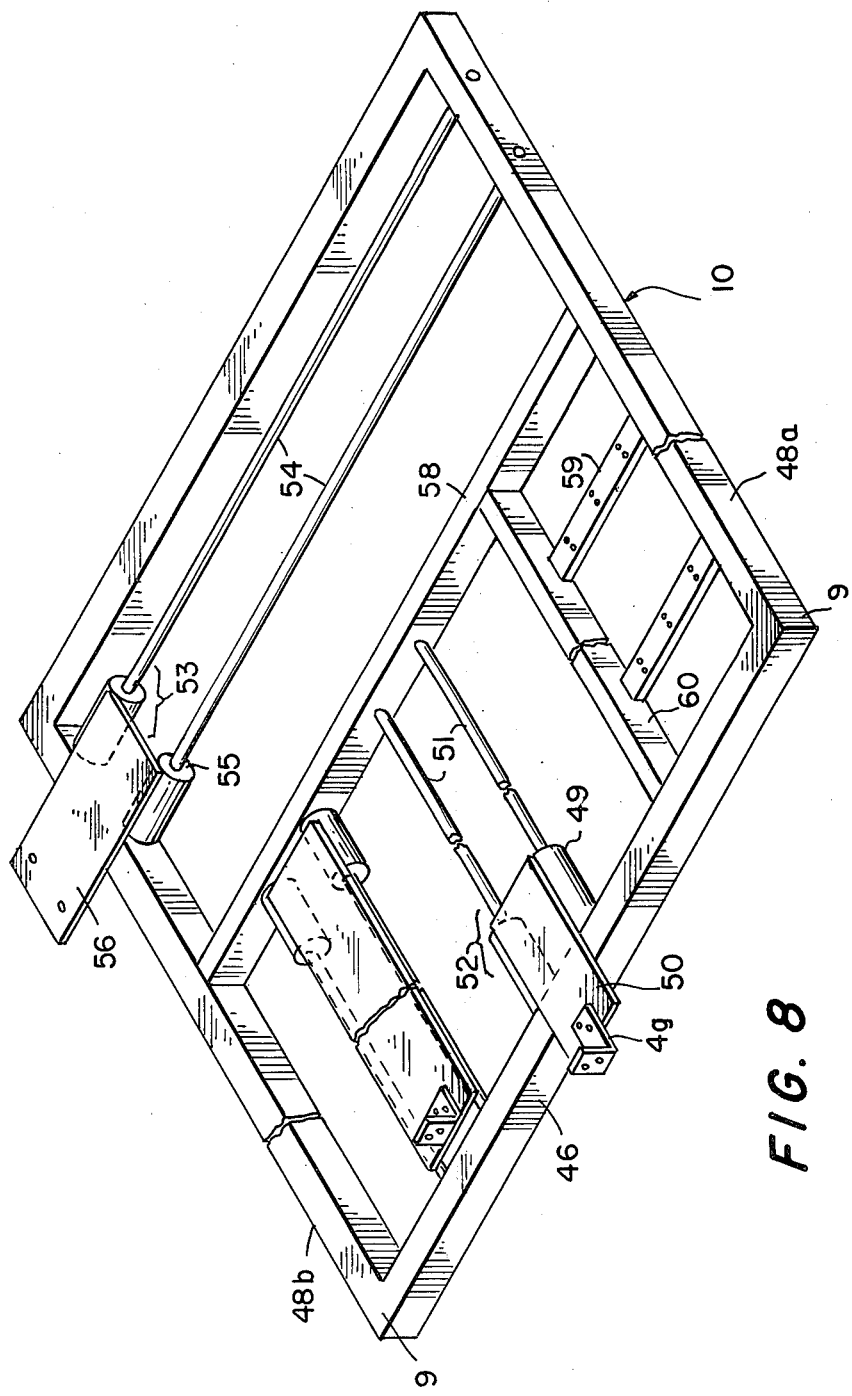

slide that is attached to the upright frame and is extendable beyond the frame and below the base.

FIG. 10 is a schematic perspective view of a box frame of this invention which bears a telescoping instrument attachment slide and which is held at a variable angle to a box base.

DESCRIPTION OF THE PREFERRED EMBODIMENTS

The box base of the instrument support apparatus of this invention may be made of any suitably strong and rigid material and its dimensions may be varied widely. Because of weight and strength considerations, it is preferred that the base be made of aluminum with all four sides longitudinally elongated.

Similarly, the material of construction and dimensions of the upright frame may be varied, but preferably the frame has two parallel, longitudinally elongated aluminum legs, each of which is attached at its upper end to one end of a longitudinally elongated aluminum bridging cross beam and is attached at its lower end to a side of the base. While both legs may be attached to a single side, it is preferable for stability that they be attached to opposite sides of the base at points remote from the ends of those sides. It is particularly preferred that the outside surface of each leg be attached to the inside surface of the base side in order to lower the center of gravity of the stand. The method of attachment may be fixed, as by bolting or welding, or removable with variable position or angle on the base, as by insertion in slots in the base or attachment through a clutch, as shown in the examples below. Variable angle attachment provides the capability to operate the supported scientific instrument in horizontal or vertical position, as well as in an inclined position, as required, for example, by ASTM Designation B95-39, Standard Method of Test for Linear Expansion of Metals.

While a simple upright inverted "U" frame is adequate for many purposes, where heavy loads are to be supported, or the frame is to be used without a base, it is preferable that at least one additional bridging cross-beam be used for stability. Most preferably, at least one of these additional bridging cross beams is attached at its ends to the lower ends of the legs, thus forming a rectangular box frame having two opposed open sides. Additional bridging cross-beams or vertical beams are advantageously employed for instrument attachment, as are both fixed and movable rods, clamps and brackets.

As indicated above, one aspect of this invention is a box frame having an instrument support bracket which can be moved along the axis of a track attached to the frame and which can be extended beyond the frame. Such movable bracket is particularly useful for aligning delicate or heavy instruments and accessories which must be oriented coaxially, and its ability to be extended beyond the frame minimizes the frame size requirement.

A wide variety of movable bracket and stationary track assemblies are commercially available which will meet these requirements. Those bracket and track assemblies that are not dependent on gravity to maintain contact between the bracket and track are preferred, as they permit use of the assembly in any position. Exemplary of such are telescoping slides in which the movable track (i.e. the movable bracket) or tracks can neither be lifted off the stationary track nor slid off its ends. The use of such telescoping slides permits the stationary track to be attached to the frame so that the entire stationary track is within the frame, thereby minimizing laboratory bench space requirements, as well as frame size requirements.

Because of its sturdiness, low friction and freedom from rotational movement, a telescoping slide of the type illustrated in FIG. 8, below, is greatly preferred. The movable bracket of such slide has multiple sleeves, two or more of which encircle and slide along rods that are attached at both ends to the frame. The bracket is elongated with the point of instrument attachment remote from the sleeves, so that the instrument bearing portion of the bracket may be extended beyond the frame.

Another outstanding type of telescoping slide is illustrated in FIG. 6, below. Such slides typically have a longitudinally elongated rectangular bar track which is fixed to the frame and a longitudinally elongated open sleeve which partically encircles the bar. The sleeve is slidable along the bar on ball bearings which are held in keyways on opposing sides of the bar, each keyway being bounded by a concave longitudinal groove on the bar and a matching concave longitudinal groove on the inner surface of the sleeve.

Referring again to FIG. 1, there is shown a particularly simple, lightweight and compact embodiment of this invention in which the upright legs 48 and crossbeam 3 form an inverted "U" frame 2 which is held to the inside surfaces of box base 1 by plow bolts 5. Instruments (not shown) can be suspended from optional brackets 4a, both of which are attached to frame 2 by bolts 5.

The embodiment of FIG. 2 represents an instrument stand that is somewhat more rigid and of wider applicability than the embodiment of FIG. 1. Cross-beams 3a and 3b bridge the upper and lower ends, respectively, of legs 48, forming rigid box frame 10. Cross-beam 3b also serves to support integral instrument bracket 4c, as well as the lower ends of instrument attachment rods 7, which are attached at their upper ends to cross-beam 3a. The lower corners 9 of the box frame 10 are held in slots 8 in box base 1, which base rests on leveling screws 6. When a light load is carried on bracket 4c and rods 7, it is convenient for the operator to place frame 10 in the set of slots 8a which are closest to him. The additional stability desirable for handling larger loads can be achieved by moving frame 10 to a more distant set of slots 8b.

The embodiment of FIG. 3 represents an instrument stand in which both the position and angle of the upright box frame 10 is adjustable relative to the box base 1. The lower corners 9 of the frame 10 are held by friction in frame brackets 12, each of which, as shown in greater detail in FIG. 4a, is attached to an abrasive or rubber surfaced 13 a fixed clutch plate 13. Plate 13 faces a similarly surfaced 14a movable clutch plate 14, which has two prongs 15 that fit into recesses 16 in base 1. As shown in FIG. 4b, plate 13 rests on nipple 17, which extends from plate 14 into the base of slot 21. The clutch plates are engaged by turning knurled knob 19 on clutch engagement screw 18, thereby moving the screw inward through threaded hole 20 in base 1 and applying pressure to the back of movable clutch plate 14.

When both sets of clutch plates are disengaged, brackets 12, which hold frame 10, can be lifted off nipples 17 through the open ends of slots 21. Removal of this assembly permits prongs 15 of movable clutch plates 14 to be removed from recesses 16 and the plates repositioned in another set of recesses on base 1. Replacement of the brackets 12 and frame 10 on nipples 17

INSTRUMENT SUPPORT APPARATUS

BACKGROUND OF THE INVENTION

1. Field of the Invention

This invention relates generally to apparatus for supporting scientific instruments and associated equipment. More particularly, it relates to compact instrument support apparatus which are rigid, have low centers of gravity and have a low weight relative to their instrument carrying capacity.

2. Description of the Prior Art

The most common form of scientific instrument support is a simple stand having a single vertical rod or post mounted in a heavy base plate with the instrument being clamped to the rod or post. When a sufficiently heavy or broad base plate is employed, the center of gravity is low enough to support a substantial instrument weight, but the single point mounting of the rod or post does not provide the rigidity that is necessary when heavy or delicate instruments and accessory equipment repeatedly must be moved on the stand and then realigned. Illustrative of such instrument and accessory equipment is a dilatometer that has a fragile ceramic sample tube that must be aligned with and inserted into an electric tube furnace.

For such requirements, the rod or post often is replaced by an upright heavy metal instrument attachment plate mounted at a right angle to the base plate. In order to facilitate movement and alignment of the sample tube and furnace, the latter often is mounted on wheels, at least two of which have concave rims and can roll along a horizontal convex track. For vertical movement, the furnace often is attached to a sleeve that encircles and is slidable along a rod track. Since the furnace in both cases is movable only along the length of the track, both ends of which are attached to the heavy upright plate, the plate must be very large to accommodate a track of sufficient length to permit disengagement of a long dilatometer sample tube from the furnace. While such large and heavy upright plate provides needed rigidity, the requirement of a low center of gravity necessitates the use of a compensating weight in the base plate, thereby making the stand extremely heavy relative to its support capacity. Another disadvantage of a heavy upright plate is the fact that one cannot, without cutting through the heavy metal, mount gauges and controls flush on the surface of the plate where they would be easily viewable and accessable without interfering with instrument operation. Similarly, without cutting through the metal plate, any wires or tubing that lead to the instrument must be on the instrument face of the plate; i.e. in the operator's working area.

SUMMARY OF THE INVENTION

It is an object of this invention to provide a rigid instrument stand having a low center of gravity and a low stand weight relative to its instrument support capacity. A further object of this invention is to provide such stand in which gauges and controls readily can be mounted on the upright portion of the stand in easily visible and accessible position without interfering with instrument operation. It is a specific object of this invention to provide such stand in which the upright portion may be perpendicular or inclined with respect to the horizontal base. A further specific object of this invention is to provide a rigid lightweight frame for heavy or delicate instruments which can be used with or without a base, and which has provision for movable instrument mounting so that the instrument is extendable beyond the frame.

It has been found that these objects and other advantages, which will be apparent from this specification, are achieved by the invention described below.

Broadly, my invention is instrument support apparatus comprising a rectangular box base having open top and bottom ends and an instrument attachment frame having two upright legs and a bridging cross-beam, each said leg being attached at its upper end to said cross-beam and being held at its lower end to a side of said base.

More specific embodiments of my invention include such instrument support apparatus in which the lower ends of the legs of said instrument frame are bridged by a second cross-beam, thereby forming an upright rectangular box instrument frame having two opposed open sides; such apparatus in which means are provided for varying the angle at which said frame is held to said base; and a rectangular box instrument frame which can be used alone (in a horizontal position) or in combination with said base (in an upright position), and which has at least one instrument attachment bracket which is slidable along the axis of a track, said track being attached to said frame and said bracket being extendable outside said frame.

BRIEF DESCRIPTION OF THE DRAWINGS

FIG. 3 is a schematic perspective view of another embodiment of this invention in which a removable upright frame is held in variable position and angle on the base.

FIG. 4a is a schematic cross-section along line A—A of FIG. 3 showing a clutch mechanism for varying the position and angle of the upright frame.

FIG. 4b is an exploded perspective view illustrating the relationship of the elements of the clutch mechanism of FIG. 4a.

FIG. 5a is a schematic partial cross-section of an embodiment of this invention showing the arrangement of pegs which can be used to adjust the angle between the horizontal base and the upright frame.

FIG. 5b is a plan section, along line P—P of FIG. 5a, of a corner of the upright frame of FIG. 5a.

FIG. 6 and FIG. 8 are schematic perspective views (parts removed in FIG. 6) of box frames which are suitable for use alone in a horizontal position or, in combination with any of the box bases of FIGS. 1 through 4, in an upright position and which have telescoping instrument attachment slides that are extendable beyond the frames.

Figure 1:
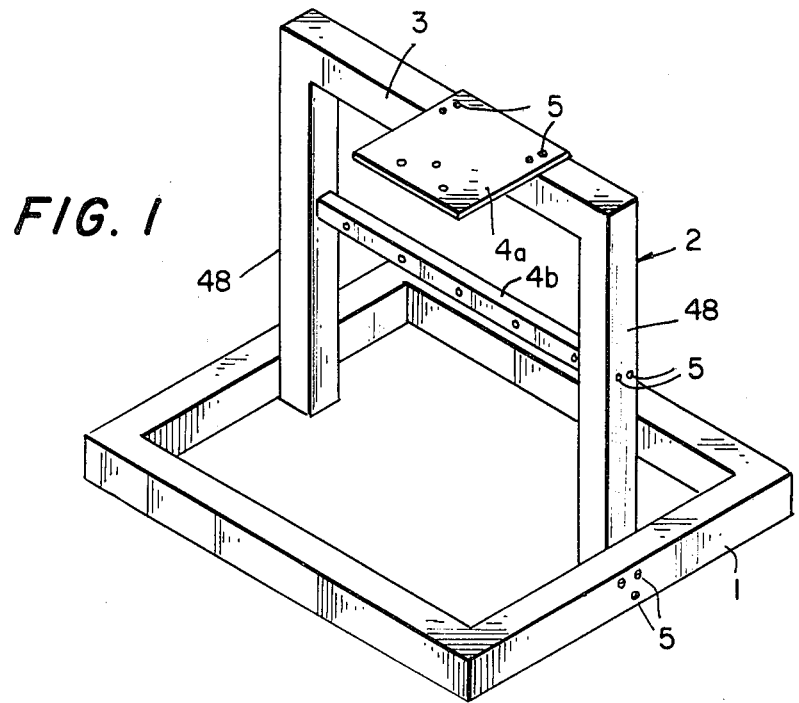
FIG. 1 is a schematic representation in perspective of an instrument stand of this invention in which the upright frame is fixed to the base.
Figure 2:
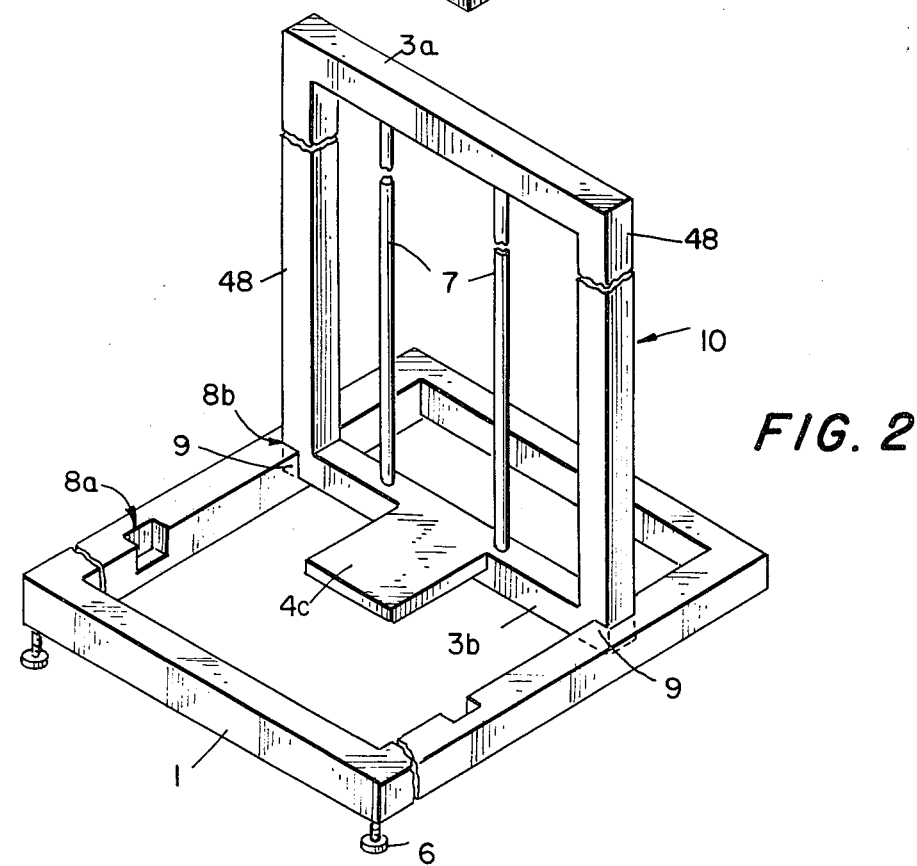
FIG. 2 is a schematic perspective view of another embodiment of this invention in which the upright frame is held in slots in the base and easily can be removed and repositioned.

The box frame 10 of FIG. 3 is designed to support an instrument (not shown) from bracket 4d and one or more gauge or control panels (not shown) from brackets 11, which bridge vertical beam 44 and one leg 48a of the frame. Advantageously, the body of the gauge or control is mounted on the back surface of a light weight sheet metal panel with only the face of the gauge or control knobs protruding through holes in the panel and facing the operator. Positioning of the gauges and controls in this fashion makes them readily visable and accessable to the operator without interfering with his manipulation of the instrument. With such easily removed panels, it is a simple matter to change gauges and controls and to arrange them in an orderly sequence of use.

FIGS. 5a and 5b illustrate another somewhat simpler means of adjusting the angle at which the box frame is held to the base. An axle screw 22 is turned by knurled knob 19 thru threaded hole 23 in box base 1 and into axle screw recess 26 in corner 9 of frame 10. When such axle screws are inserted through opposing sides of the base and corners of the frame, the frame can rotate freely. It may be locked in a desired position by inserting peg screw 24 into threaded peg screw hole 25 in base 1, and, by turning knurled knob 19, extending it into peg screw recess 27 in corner 9 of frame 10. As shown in FIG. 5b, one can lock frame 10 at an angle relative to box base 1 that is controlled by the position of the selected peg screw recess 27.

Figure 6:
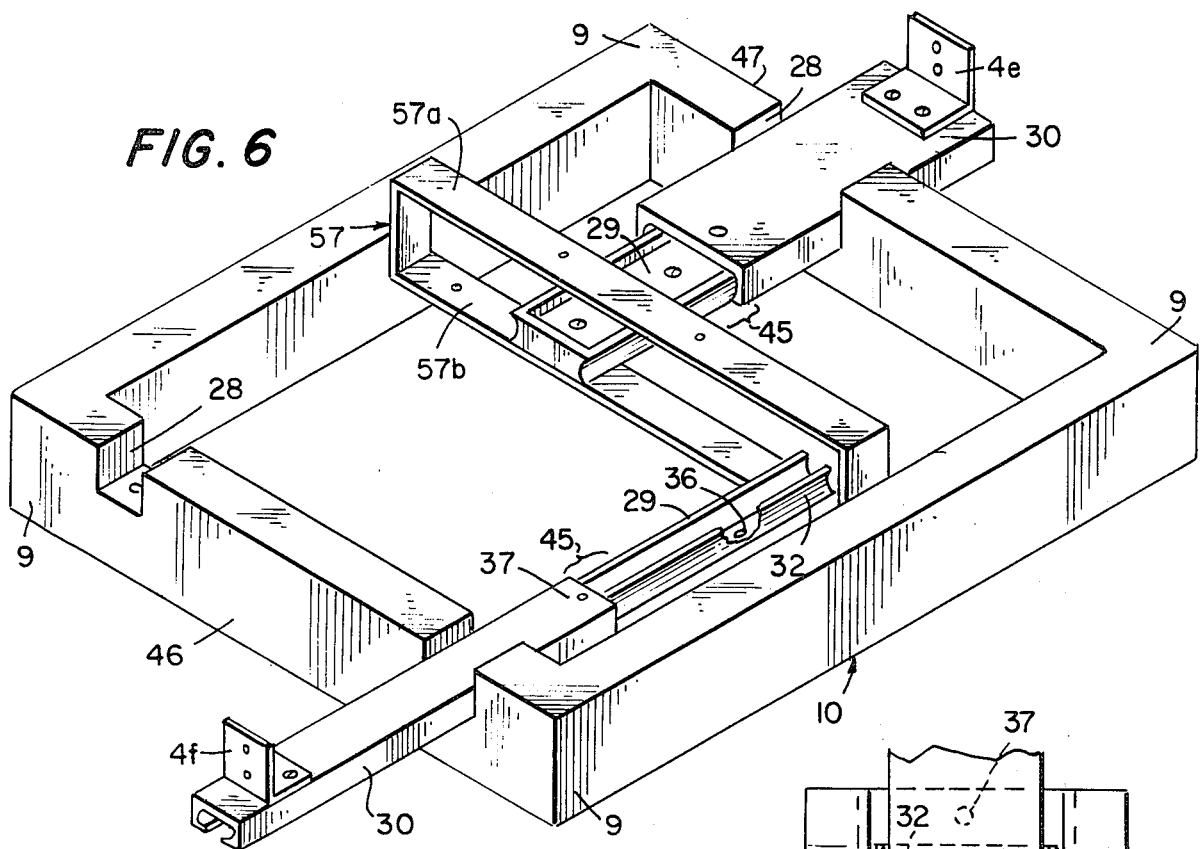

FIG. 6 shows a box instrument frame which either can be employed alone in a horizontal position (as illustrated) or can be used in an upright position by holding two adjacent corners 9 at opposing sides of any base shown in the preceding examples.

Frame 10 is equipped with a crossbeam 57 and telescoping slides 45 to which instruments or accessories may be attached and which permit these instruments or accessories to be extended beyond the frame. The frame and slides as illustrated here are designed for use with a dilatometer and an electric tube furnace (neither shown). The dilatometer measuring head is fixed to the top 57a of crossbeam 57, with its ceramic sample tube extending toward end 46 of frame 10. An insulated case (not shown) for the dilatometer measuring head is mounted on bracket 4e which is attached to the telescoping slide 45 that extends from the bottom 57b of crossbeam 57 to a slot 28 in the end 47 of frame 10, thus permitting the case to be easily and quickly moved on and off the dilatometer head without the need for manual alignment. Similarly, manual alignment of the ceramic sample tube and the heavy electric tube furnace is unnecessary when the tube furnace is attached through brackets 4f to the telescoping slides 45 (only one shown) which bridge the bottom 57b of crossbeam 57 and slots 28 on end 46 of frame 10. The telescoping slides are extended (as shown) beyond frame 10 when changing samples or making adjustments on the dilatometer head and are withdrawn into the frame during instrument operation, thus minimizing the frame size and weight requirement.

Figure 7A:
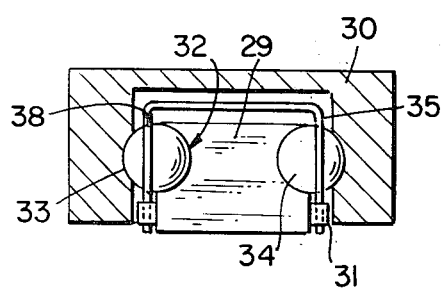
FIG. 7a is an end cross section, along line 7a—7a of FIG. 7b, of the telescoping ball bearing slide of FIG. 6.
Figure 7B:
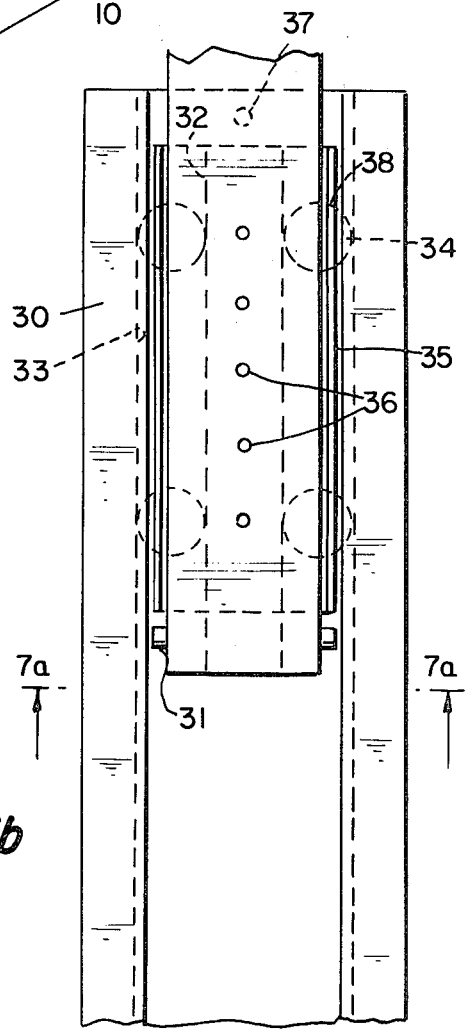
FIG. 7b is a bottom plan section of the slide of FIG. 6.

The structure of the telescoping slides of FIG. 6 is shown in greater detail in FIGS. 7a and 7b. A fixed track 29 supports movable track 30 on ball bearings 34 which move in two keyways formed by concave surfaces 32 in fixed track 29 and concave surfaces 33 in movable track 30. The ball bearings 34 extend through and are retained by holes 38 in ball bearing frame 35. Longitudinal movement of movable track 30 on fixed track 29 is limited by stop pegs 31 which, upon extension of the slide, abut an end of the ball bearing frame 35 and prevent further movement of the ball bearings 34 and the movable track 30. Movable track 30 may be locked in a desired position on fixed track 29 by inserting a peg (not shown) through hole 37 on movable track 30 and any of holes 36 on fixed track 29.

FIG. 8 shows another box instrument frame 10 with telescoping slides 52 and 53, which frame either can be employed alone in a horizontal position, as illustrated, or can be used in an upright position by holding adjacent corners 9 at opposing sides of a box base. The frame and slides as illustrated here are designed to support a single dilatometer (not shown) and two electric tube furnaces (not shown). Since a significant period of time is required to stabilize an electric furnace at a desired temperature, the availability of multiple furnaces greatly reduces the time required to measure thermal expansion of a sample at different temperatures.

The dilatometer is mounted on movable track 56 of telescoping slide 53 with its sample tube extending toward and being perpendicular to end 46 of frame 10. Sleeves 55 on track 56 encircle and slide on rod tracks 54, each of which is attached at one end to side 48a of frame 10 and at the other end to side 48b. An electric tube furnace is attached, with its tube recepticle parallel to the sample tube of the dilatometer, through bracket 4g to each of telescoping slides 52. Sleeves 49 on slides 52 encircle and slide along rod tracks 51 which bridge crossbeam 58 and end 46 of frame 10.

The sample conveniently is placed in the dilatometer sample tube while movable track 56 is extended beyond frame 10, as illustrated. When the furnaces also are extended beyond the frame by moving tracks 50 until sleeves 49 abut frame end 46, the sample tube of the dilatometer clears the furnaces as track 56 is moved toward frame side 48a. When the tube is aligned with a furnace, it is inserted by moving the track 50 to which that furnace is attached until its sleeves 49 abut crossbeam 58.

Use of this box instrument frame in an upright position requires that means be provided to immobilize each of tracks 50 at desired positions along rods 51. An advantageous means of achieving this result is to mount a constant tension spring motor (not shown) on crossbeam 58 above that track 50 with a cable extending from the motor to the track and with the spring tension adjusted to balance the weight of the track and the furnace attached to it.

This box instrument frame, like that of FIG. 3, also is designed to support gauge or control panels in a convenient position from brackets 59, which bridge beam 60 and frame side 48a.

Figure 9:
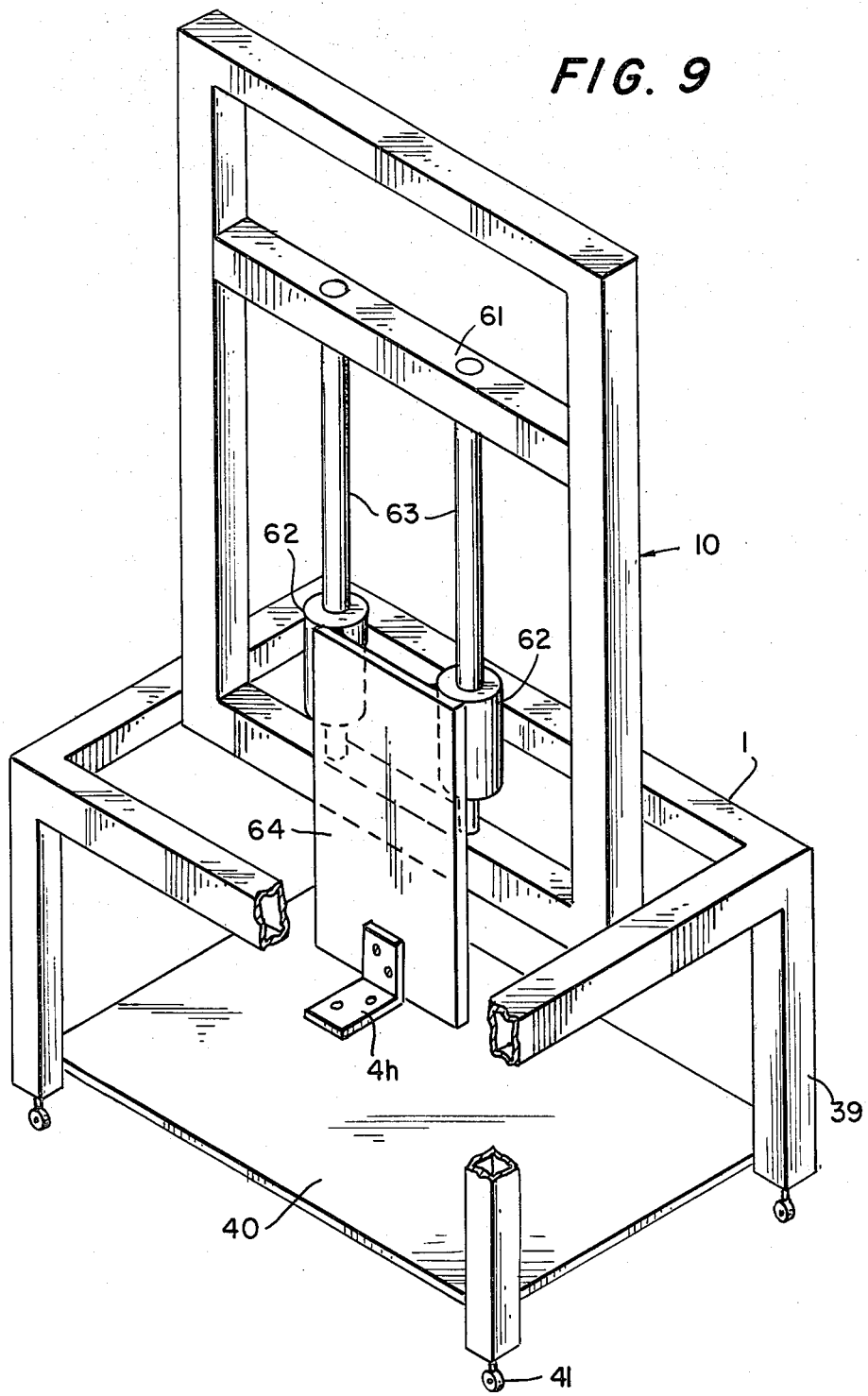
FIG. 9 is a schematic perspective view of an embodiment of this invention in which the base is provided with legs so as to accomodate a telescopeing instrument locks plates 14 in this new position. Disengagement of both sets of clutch plates also permits brackets 12 and frame 10 to rotate about the axis of nipples 17 and thereby be positioned at a desired angle relative to base 1. Engagement of both sets of clutch plates locks frame 10 into such position.

FIG. 9 shows another embodiment of this invention which is designed for the vertical movement of extremely heavy or bulky equipment. The equipment is attached through bracket 4h to movable track 64. Sleeves 62 on track 64 encircle and slide on rod tracks 63, which are attached at their lower ends to frame 10 and at their upper ends to cross beam 61. Where smoothness of movement is essential or desirable, this can be achieved readily by the use of a sleeve that holds a linear ball bearing race (not shown) on its inner surface in contact with rod 63. Track 64 may be held in a desired position on rods 63 by attaching a clamp (not shown) to one or both of rods 63 below sleeves 62. As shown here, track 64 is fully extended below frame 10 and base 1. Such extension requires the base to have vertically elongated sides, or to be supported by a hollow top table, or, as shown here, to have legs 39. Tray 40 serves to brace the legs and also can be weighted for additional stability. For the movement of very heavy loads, it may be desirable to provide a mechanical assist (not shown) for raising and lowering slide 50 as, for example, by installing an electric motor driven reel on cross beam 61 with a cable extending from the reel to the top of slide 50. Similarly, it may be advantageous to have casters 41 or retractable shock absorbing supports, such as rubber bumpers (not shown), mounted at the lower ends of legs 39.

Figure 10:
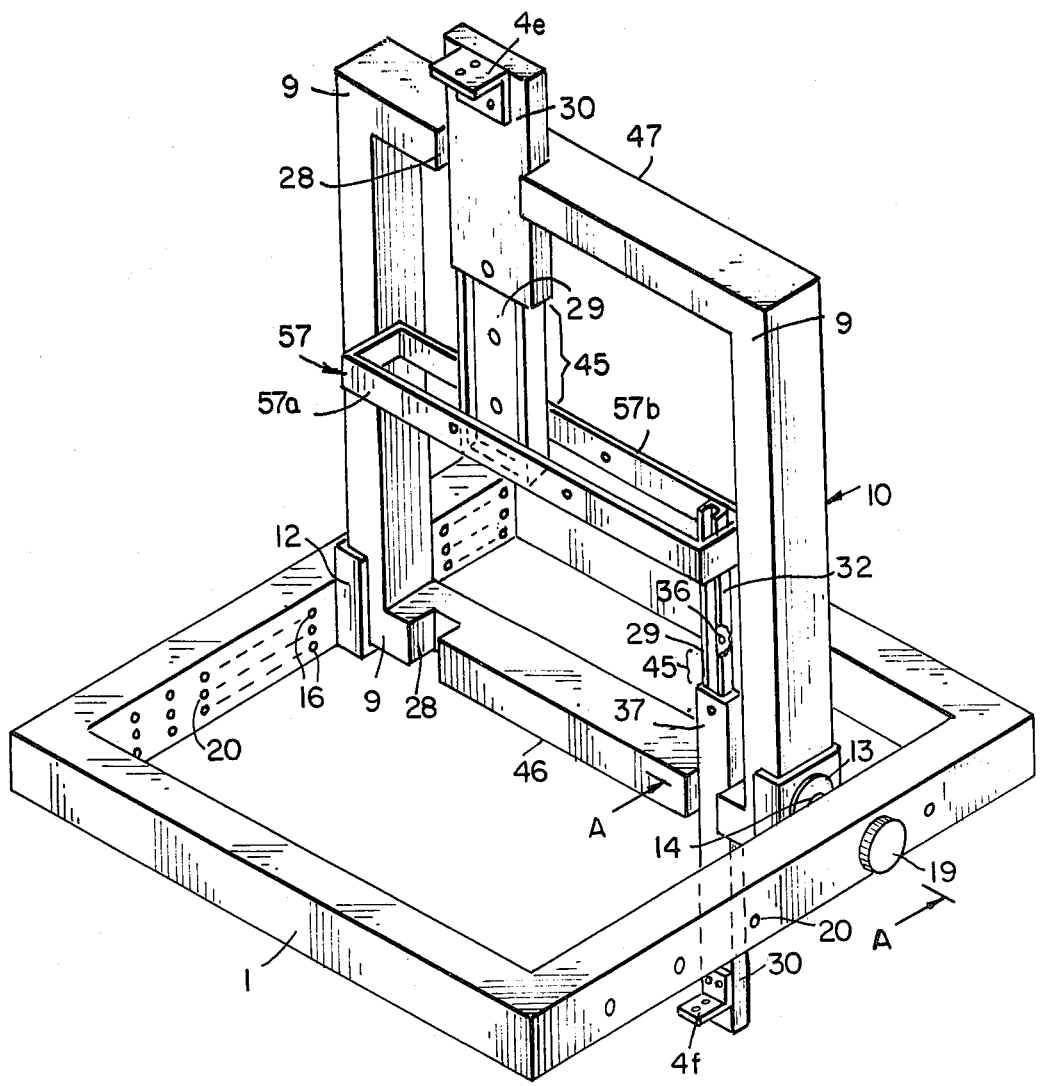

FIG. 10 illustrates the box instrument frame 10 of FIG. 6 which is held at a variable angle to the box base 1 of FIG. 3 through the clutch mechanism shown in detail in FIGS. 4A and 4B.

It will, of course, be understood that various additions and modifications may be made in the embodiments of this invention described above without departing from the spirit and scope of the invention as defined in the claims below.

The embodiments of the invention in which an exclusive property or privilege is claimed are defined as follows:

1. Rectangular box instrument frame having four longitudinally elongated sides, two opposed open sides and at least one telescoping slide comprising a track which is fixed to and entirely within said frame and an instrument attachment bracket which is slidably attached to said track and is extendable outside said frame.

2. Frame of claim 1 wherein said track is an elongated rod, said bracket is a sleeve housing said rod, and said sleeve is slidable along said rod.

3. Frame of claim 2 wherein said sleeve is slidable along said rod on linear ball bearings held between said sleeve and said rod.

4. Apparatus of claim 3 including instrument attachment means comprising an instrument attachment bracket that is fixed to and slidable along the axis of a track and means for locking said bracket to said track, said track being attached to and entirely within said box frame and said bracket being extendable outside said box frame.

5. Apparatus of claim 4 wherein said track is an elongated bar, said bracket is a partial sleeve housing said bar and said sleeve is slidable along said bar on ball bearings which are held in keyways bounded by concave longitudinal grooves on opposing outer surfaces of said bar and by matching concave longitudinal grooves on opposing inner surfaces of said sleeve.

6. Instrument frame of claim 1 wherein two opposed elongated sides of said frame are held to opposed elongated sides of a second rectangular box frame having four longitudinally elongated sides and two opposed open sides.

7. Instrument frame of claim 1 including means for varying the angle at which said instrument frame is held to said second frame.

8. Rectangular box instrument frame having four longitudinally elongated sides, two opposed open sides and at least one telescoping slide comprising a track attached to and entirely within said frame and an instrument attachment bracket slidably fixed to said track and extendable outside said frame, said track being an elongated bar, said bracket being a partial sleeve housing said bar and said sleeve being slidable along said bar on ball bearings which are held in keyways bounded by concave longitudinal grooves on opposing outer surfaces of said bar and by matching concave longitudinal grooves on opposing inner surfaces of said sleeve.

9. Instrument frame of claim 8 wherein two opposed elongated sides of said frame are held through clutch means to two opposed elongated sides of a second rectangular box frame having four longitudinally elongated sides and two opposed open sides.

* * * * *